United States Patent
Fulker et al.

(10) Patent No.: US 6,931,033 B2
(45) Date of Patent: Aug. 16, 2005

(54) PUMP SOURCE FOR LASERS

(75) Inventors: David James Fulker, Farnborough Hants (GB); Mark Ralph Venner, Farnborough Hants (GB); Andrew James Finlayson, Farnborough Hants (GB); Anthony David Case, Farnborough Hants (GB)

(73) Assignee: Qinetiq Limited (GB)

( * ) Notice: Subject to any disclaimer, the term of this patent is extended or adjusted under 35 U.S.C. 154(b) by 236 days.

(21) Appl. No.: 10/362,790

(22) PCT Filed: Aug. 21, 2001

(86) PCT No.: PCT/GB01/03748

§ 371 (c)(1),
(2), (4) Date: Feb. 25, 2003

(87) PCT Pub. No.: WO02/19482

PCT Pub. Date: Mar. 7, 2002

(65) Prior Publication Data

US 2004/0028107 A1 Feb. 12, 2004

(30) Foreign Application Priority Data

Sep. 1, 2000 (GB) .............................................. 0021463
Jun. 14, 2001 (GB) .............................................. 0114447

(51) Int. Cl.[7] ................................................ H01S 3/30
(52) U.S. Cl. .................................. 372/7; 372/5; 372/39; 372/66; 372/69
(58) Field of Search ........................... 372/69, 70, 78, 372/5, 7, 39, 66

(56) References Cited

U.S. PATENT DOCUMENTS

| | | | | |
|---|---|---|---|---|
| 3,573,653 A | * | 4/1971 | Smiley | 372/7 |
| 3,914,648 A | * | 10/1975 | Friedman et al. | 315/241 P |
| 3,967,213 A | * | 6/1976 | Yariv | 372/96 |
| 4,665,526 A | * | 5/1987 | Shipman et al. | 372/83 |
| 4,788,691 A | | 11/1988 | Herziger et al. | 372/84 |
| 4,827,479 A | * | 5/1989 | Campbell et al. | 372/5 |
| 5,023,877 A | * | 6/1991 | Eden et al. | 372/7 |
| 6,022,592 A | | 2/2000 | Reisfeld et al. | 427/379 |

FOREIGN PATENT DOCUMENTS

JP    06 275897    9/1994

OTHER PUBLICATIONS

Knecht, et al. "Compact XeF(C–A) and iodine laser optically pumped by a surface discharge", *Optics Letters*, vol. 20, No. 9, pp. 1011–1013 (1995).

Tsikrikas et al., "The Effect of Voltage Pulse Polarity on the Performance of a Sliding Discharge Pumped HF Laser", *Journal of Physics D. Applied Physics*, vol. 29, pp. 2806–2810 (1996).

(Continued)

*Primary Examiner*—Don Wong
*Assistant Examiner*—Leith Al-Nazer
(74) *Attorney, Agent, or Firm*—McDonnell Boehnen Hulbert & Berghoff LLP (57) ABSTRACT

This invention relates to the field of lasers and in particular to the pump sources used in lasers. Many existing lasers use linear flashlamps in order to create population inversion in the gain medium of the laser. Such pump sources suffer from a number of drawbacks particularly when pumping dye lasers including explosive damage, long optical pulse length and inappropriate spectral emission. This invention provides a pump source for a laser which exploits the surface discharge phenomenon. A dielectric material (1) which is in contract with a gas (9) has electrical energy discharged across its surface in order to provide an electromagnetic emission which is then used to pump the gain medium. By varying the dielectric material or the cover gas used (amongst other variables) the surface emission can be used to pump the laser gain medium.

37 Claims, 5 Drawing Sheets

OTHER PUBLICATIONS

Bergmann, "Investigation of Nanosecond Development of Surface Discharge Phenomena", *Proceedings of the SPIE*, vol. 674, pp. 94–103 (1986).

Yu, et al., "Experimental Study on XEF(C–A) Laser Pumped by Surface Discharge Radiation", *Proceedings of the International Conference on Lasers 97*, pp. 83–87 (1997).

Langley, et al, "High–brightness Femtosecond Laser Using Titanium–Sapphire Technology and Amplification in Dyes", *Applied Optics*, vol. 33, pp. 3875–3880 (1994).

Everett, et al., "Efficient 7–J Flashlamp–pumped Dye Laser at 500–nm Wavelength", *Applied Optics*, vol. 25, pp. 2142–2147 (1986).

Hasson, et al. "Spatial Control of Pulsed High–Pressure Pre–ionisation Stabilised Glow Discharges", *J. Phys. E. Sci. Instrum*, vol. 13, pp. 632–638 (1980).

Li Changyong et al, "XeF Excimer UV Emission Spectrum Excited by Discharge with Surface Preionization over the Teflon Plate", *Chin J. Lasers*, vol. A25, pp. 220–224 (1998).

* cited by examiner

PUMP SOURCE FOR LASERS

BACKGROUND OF THE INENTION

1. Field of the Invention

This invention relates to the field of lasers and in particular to the pump sources used in lasers.

2. Description of Related Art

Lasers work by creating a so-called population inversion in a material (conventionally referred to as the "gain medium") which is then stimulated to produce a coherent emission of photons. The pump source is the component of the laser which excites the gain material into a state of population inversion and different lasers utilise a variety of processes to create the population inversion. For example, the common He—Ne laser uses a high voltage electrical discharge to excite a He—Ne mixture in a discharge tube to population inversion.

Typical flashlamp pumped dye lasers comprise several linear flashlamps which are symmetrically placed around a central cell containing dye (the gain medium). A reflector surrounds both the dye cell and flashlamps and directs light into the dye cell (see *L. G. Nair, 'Dye lasers', Prog.Quant.Electr.*, vol. 7, pp153–268, 1982 for a discussion on flashlamp pumped dye laser structures). The most common dye material used is rhodamine 6G which has been dissolved in methanol solvent. Generally powerful, incoherent pump sources are used in order to obtain efficient system operation from a dye laser. The most common example is that of a dye laser being pumped by a conventional xenon filled flashlamp. Such a device can operate with efficiencies of >1% although a level of 0.5 to 1% is more typical.

Using the above type of flashlamp as a pump source has a number of drawbacks. Firstly, there is the risk of a flashlamp explosion. When a discharge occurs through a flashlamp a plasma filament is heated electrically and expands rapidly. This creates a shockwave which can rupture the surrounding silica envelope and thereby causing a flashlamp explosion. This risk of damage means that the level of electrical energy that can be used to drive the flashlamp must be limited. This has important consequences on the laser efficiency and on the output energy of a flashlamp pumped laser.

Secondly, the optical spectrum from a flashlamp is thermal in nature and can be considered a quasi black body with a temperature of ~20000 K. This means that a considerable fraction of the pump light resides in the hard ultra-violet region of the electromagnetic spectrum and this causes significant degradation and heating of the dye solution, as well as resulting in a poor absorption spectrum overlap (The dye solution that comprises the gain material consists of a dye and a solvent. Hard ultra-violet radiation from the pump source will damage the dye molecules making them unable to take part in laser action. Also hard UV photons are very energetic so if they are absorbed by the dye they will be converted into a large amount of heat which is dissipated in the dye solution.). Often in smaller flashlamps ablation of the flashlamp itself can produce materials that contaminate the Xe gas thereby affecting the emission profile.

Thirdly, flashlamps generally have a high initial impedance which limits the energy deposition rate for the discharge. This results in a relatively long electrical driving pulse (of the order of ~$\mu$s) and can promote the development of significant laser losses such as large triplet state population and/or powerful thermal lensing. The triplet state is a significant loss mechanism for dye lasers. When a dye molecule is in the triplet state it is unavailable for laser action and is a source of absorption losses for the laser emission. A high triplet state population therefore reduces laser power and energy. Thermal lensing in the dye gain medium causes a deterioration of the laser beam quality and is a loss mechanism for laser emission. Thermal lensing is caused when heat is deposited in the dye gain medium which causes refractive index changes in the solvent. The solvent therefore has the properties of a lens.

Surface discharge pumping mitigates at least some of the aforementioned disadvantages and is described for example in Optics Letters 20 pp 1011–1013 and the Journal of Physics D (Applied Physics) 29 pp 2806–2810 (1996) in relation to pumping of iodine and HF lasers, respectively.

BRIEF SUMMARY OF THE INVENTION

According to the present invention there is provided a pump source for a laser comprising a slab of dielectric material said slab having at least part of its surface exposed, containment means for retaining a gas in contact with said exposed surface said containment means being capable of being charged with a suitable gas and an energy supply means arranged such that in operation of the source said supply means is capable of supplying energy across said exposed surface of the substrate thereby initiating a surface discharge wherein the impedance of the energy supply means is substantially matched to the impedance of the surface discharge and the slab of dielectric material is doped such that it is capable in use of acting as a laser gain material.

Correspondingly, there is provided a method of pumping the gain medium of a laser comprising the steps of i) retaining a gas in contact with an exposed surface of a slab of dielectric material ii) supplying energy across the exposed surface of the dielectric material by means of an energy supply circuit in order to initiate a surface discharge wherein iii) the impedances of the surface discharge and the energy supply circuit are arranged to be substantially matched, and iv) the slab of dielectric material is doped such that it is capable in use of acting as a laser gain material.

The invention utilises radiated optical emission from a surface discharge to provide a laser pump source. As well as dye lasers the surface discharge is suitable for use in photodissociation lasers and neodymium glass lasers which also conventionally use flashlamps as the pumping source. The containment means provides the cover gas for the arrangement and is capable of being charged with a suitable gas. This therefore allows a user to select a gas of their own.

The device works by discharging electrical energy across the surface of the dielectric material (commonly referred to in the art as the "substrate"). The discharge begins by the initiation of multiple plasma streamers from the energy supply means, conveniently a high voltage electrode. These streamers grow from the HV electrode across the substrate towards an earth electrode often merging into a plasma sheet as they develop. When they bridge the gap between the electrodes a high current builds up in the streamers which causes the gas to heat up and the substrate to ablate and become part of the gas. The spectral emission therefore originates from both the cover gas and substrate constituents. The whole process from initial energy supply to radiative emission is commonly referred to as a "surface discharge". Electromagnetic emission from this surface discharge occur from the infrared to the vacuum ultraviolet wavebands. The use of specific substrates and gases can alter the emission profile of the invention. For example, the emission can occur in the optical region making them suitable for a laser pumping source for a dye laser.

Compared to flashlamps there is a lack of silica walls and so the device can support higher input energies. The absence of silica walls bounding the surface discharge means that any shockwave emanating from the discharge plasma is allowed to dissipate in the gas volume. This is not the case with flashlamps where the silica walls have to confine the shockwave. There is clearly an energy limit above which a silica envelope cannot contain the shockwave and the silica ruptures. This energy limit is called the explosion energy. Further, the radiated output is has significant line structure and is not considered to be thermal.

Advantageously the spectrum of emitted radiation can be altered by varying the gas, dielectric material and the configuration of the energy supply means. This enables the pump source to be tailored to the absorption spectrum of the material being used for the gain medium.

The planar geometry of the invention results in a lower inductance than linear flashlamp devices. Surface discharges normally consist of many streamers which commonly form a planar plasma. An earth return is connected directly to the underside of the substrate. There is no high intensity magnetic field or large circuit loop area associated with this plasma geometry and hence the inductance is low. In contrast a flashlamp normally contains a single plasma streamer which initially has a small cross-sectional diameter. The earth return is normally a considerable distance from the flashlamp. This causes intense magnetic fields close to the streamer and a large circuit loop area and contributes considerably to the inductance. In order to ensure efficient energy transfer between the energy supply means and the substrate it is necessary to ensure that the impedance of the energy supply means is substantially matched to the impedance of the surface discharge. The impedance of the surface discharge will be dependent on a number of factors including the temperature and dimensions of the discharge and so will therefore be affected by the type of gas used and the area of the substrate over which the discharge occurs.

A low impedance allows high peak power, short discharge pulses to be created for moderate operating voltages (~20 kV). This helps to reduce laser losses and the thermal lensing mentioned above. Therefore, since the impedance of the surface discharge system is lower than for flashlamps it is expected to be more efficient The energy supply means normally consists of a capacitive energy store, a transmission line, a switch and a pair of electrodes. Discharge circuits comprising either a self matched cable pulse generator or a low inductance resonant discharge circuit have been found to be effective. The pulse generator capacitively stores energy in high voltage cables which are then discharged onto the surface of the substrate in a time determined by the cables' characteristics. The resonant discharge circuit stores energy in a capacitor which can then be switched to the surface of the substrate.

In order to achieve a uniform electrical breakdown it is preferable to apply a voltage pulse with a fast rising edge to the HV electrode because this results in the formation of multiple breakdown arcs which can then form a uniform surface plasma. Conveniently, the resonant discharge circuit has this characteristic and can discharge energy quickly (~300 ns) and is more efficient at transferring energy than the cable generator set-up. The resonant discharge circuit is capable of driving low impedance loads with a high peak power electrical pulse. It is therefore suitable for the driving of low impedance surface discharge loads and is capable of producing the high peak powers required of a pulsed dye laser pump source.

The gas used also strongly affects the optical emission characteristics of the pump source. The gas type (and also the pressure of the gas) affects the uniformity of the discharge. Preferably, noble gases (at less than 1.5 bar), $CO_2$ (<0.5 bar) or $SF_6$ (<100 mbar) should be used.

It has been found that the addition of a small percentage of $SF_6$ to a noble gas (such as Xe or Kr) increases the emission activity in the 200–300 nm spectral band. This effect can be used to increase the pumping efficiency of the dye laser.

Conveniently, it has been found that the use of a PTFE substrate with a $Xe/SF_6$ or $Kr/SF_6$ gas produces a particularly intense optical emission suitable for the pumping of dye lasers.

Another factor that can affect the structural characteristics of the surface discharge is the means by which electrical contact is made between the energy supply means and the substrate. Conveniently, the use of profiled electrodes produces uniform discharges. Suitably profiled electrodes ensure that a uniform electric field is created which in turn makes it equally likely that a discharge streamer will form from any point on the HV electrode edge. A uniform discharge is therefore more likely. In gas discharge lasers Rogowski or Chang profiled electrodes are commonly used. Chang electrodes have been tested in our surface discharge systems and have produced uniform discharges. However, a simpler arrangement that also produces uniform surface discharges is the use of rounded corners to the electrodes. These corners conveniently have a radius of curvature of approximately 2–5 mm.

Surface discharges tend to have low impedances. In order that the quality of the driving electrical energy pulse is not degraded it is therefore important that the inductance of the energy supply circuit is low.

An energy supply means comprising a low inductance discharge circuit with electrodes connected to the dielectric substrate slab by striplines substantially at right angles to the surface discharge propagation direction constitutes an intrinsic low inductance energy supply means. The earth return in such an arrangement can be provided for by wrapping the earth conductor of the stripline around the side of the substrate and returning it underneath the substrate slab to the supply circuit.

The above arrangement where the electrical feeds are connected at right angles to the discharge propagation has the further advantage that it is possible to position laser mirrors close to the ends of the dye slab gain medium which has the effect of optimising the energy emission of the laser system.

Altering the substrate material will affect the optical emission characteristics of the pump source. Suitable substrate materials for use in a laser pump source are polymers, ceramics and glasses. The use of a PTFE substrate has been found particularly suited for the pumping of a rhodamine 6G based dye laser.

The thickness of the substrate is also important. A substrate must be thick enough to withstand the high electric fields and intense shockwaves that occur during a discharge. However, the substrate must not be too thick otherwise it will not allow adequate capacitive coupling between the discharge and the discharge circuit. Substrates of thickness in the range 0.5 to 6 millimetres have been found to promote uniform surface discharges with sufficient discharge/ substrate interaction to modify the spectral emission. For a PTFE substrate a thickness of ~1 mm has been found to be effective.

The spectral emission characteristics can be further enhanced by the inclusion of a suitable dopant within the substrate. A doped substrate will exhibit intense discrete spectral lines overlaid on the emission profile of the undoped substrate and conveniently the dopant material can be chosen such that these spectral lines are matched to the absorption bands of the gain medium. For example, the use of lead doped glass as a substrate produces a pumping source especially suited for use with dye based lasers.

The planar geometry of the pump source of the invention allows it to be mounted in close proximity to the gain medium in order to optimise direct pumping of the laser. In a further aspect of the invention there is provided a laser head incorporating a dye gain material operably coupled to a pump source as described above. The laser head can have a number of different configurations. Conveniently, it can have a Bethune cell configuration (see D S Bethune, "Dye cell design for high-power low-divergence excimer-pumped dye lasers", Appl.Optics, vol 20, pp. 1897–1899, 1981) or a transverse-flow configuration (see C Tallman and R Tennant, "Large-scale, excimer-laser-pumped dye lasers" in "High power dye lasers" F J Duarte Ed., Springer-Verlag, pp. 93–96, 1991). Preferably, the laser head has a Bethune cell configuration since this results in a more efficient laser.

The above laser arrangement is particularly suited to liquid dye lasers. Solid state dye lasers are however seen as an attractive alternative to liquid dye lasers and therefore a further object of the present invention is to provide a pump source arrangement that is suitable for use in a solid state dye laser.

Accordingly this invention also provides for a pump source for a solid state dye laser comprising a pump source as claimed above wherein the dielectric material is also capable of acting as a laser gain material.

Such a pump source arrangement is useful as it does not require a separate liquid dye gain medium to be located in close proximity. Instead laser action may be achieved from the substrate itself by initiating a surface discharge over the substrate.

Suitable substrates comprise a host substrate doped with a laser dye.

Examples of host substrates include sol-gel, ormosil, polymer and polymer-filled glasses. Examples of suitable dye dopants include organic laser dyes such as a pyrromethene. In particular Pyr 597 can be used as the dye dopant.

The cover gas, substrate thickness etc. can be varied in the same manner as described above.

BRIEF DESCRIPTION OF THE SEVERAL VIEWS OF THE DRAWINGS

Embodiments of the present invention will now be described, by way of example, with reference to the accompanying drawings, wherein.

DETAILED DESCRIPTION OF THE INVENTION

Figure 1A:
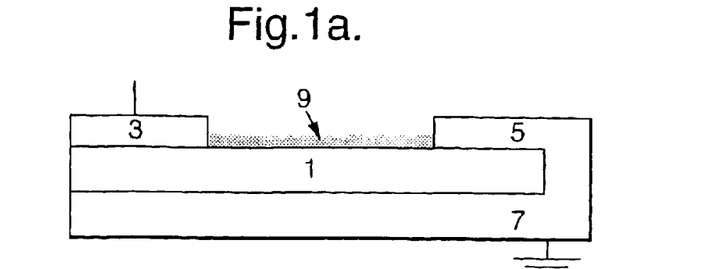
FIGS. 1a and 1b show a typical surface discharge assembly

FIG. 1a shows a surface discharge assembly suitable for use as a pump source for lasers. A planar, dielectric substrate 1 is connected via electrodes 3,5 to an energy discharge source (not shown). Electrode 5 is connected to an earth plane 7. One surface of the substrate is in contact with a gas 9.

Figure 1B:
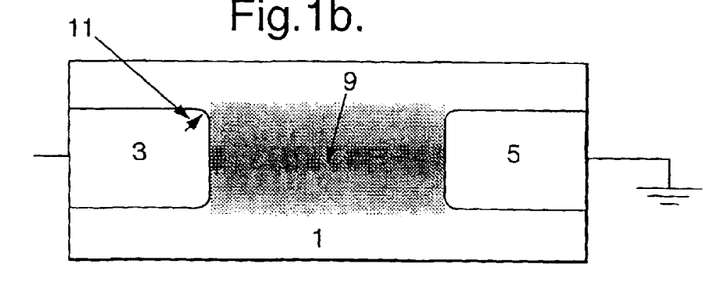

Upon initiation of a high voltage pulse from electrode 3 electrical breakdown of the gas 9 occurs in the region between the electrodes 3,5 as shown in FIG. 1b. A surface plasma is then formed.

Figure 2:
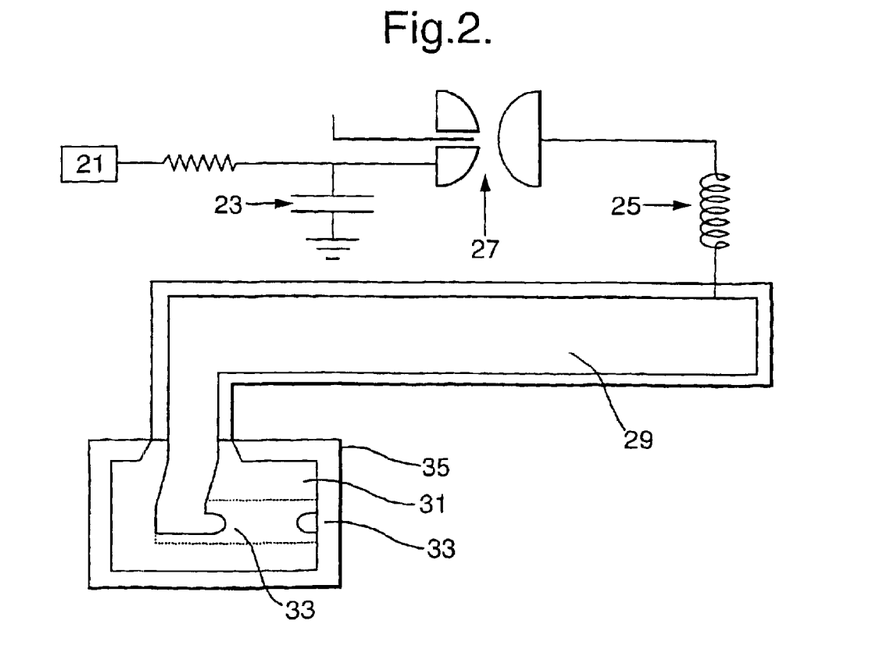
FIG. 2 shows a layout comprising a resonant discharge circuit and a surface discharge platform.

FIG. 2 shows a pump source comprising a substrate/cover gas arrangement and a resonant circuit discharge. The figure shows an ALE 402L +50 kV power supply 21 connected to a 100 nF energy storage capacitor 23. The supply 21 and capacitor 23 are located in a high inductance (~2.0 $\mu$H) section of the circuit. The inductance is generated by a loop of wire 25 and a switch 27. This switch 27 isolates the capacitor 23 from the rest of the circuit and comprises a gas filled, in line, trigatron spark gap, capable of holding off 30 kV when filled with nitrogen at a pressure of 1 atmosphere.

The circuit also comprises a 100 nF low inductance (~4 nH) capacitor 29, manufactured from a 0.5 mm thick Mylar® sheet having dimensions of 3 m×0.45 m and covered with 76 $\mu$m copper foil. This sheet capacitor is connected in series with the surface discharge load via a high aspect ratio low inductance (~5 nH) stripline (also of Mylar and copper construction). (Note: The stripline comprises two planar electrical conductors with a dielectric insulator between them. The aspect ratio refers to the width of the conductors compared with the insulator thickness i.e. a high aspect ratio is high conductor width and a small insulator thickness)

The surface discharge is provided by a dielectric substrate manufactured from 1 mm thick PTFE 31. A copper earth plane (indicated by dotted lines), 20 mm wide, is connected to the underside of the PTFE substrate 31 to minimise the surface discharge inductance. The earth plate also forms part of the stripline and the current return for the surface discharge.

Two copper electrodes 33, 10 mm wide, 0.45 mm thick, ~2 mm radius of curvature corners (see FIG. 1b where the length of the arrow on the top corner of electrode 3 represents the radius of curvature of the electrode corner) are located on the substrate 31 above the earth plane. They are 45 mm apart.

The substrate 31 is enclosed in an air tight box 35 which is filled with a mixture of Xe or Kr with a small amount of $SF_6$ (Partial pressures are 800 mbar for Xe/Kr and 150 mbar for $SF_6$).

The discharge circuit was charged to 22 kV. Upon switching of the spark gap approximately 75% of this energy was transferred to the Mylar capacitor 29 and was therefore available for the surface discharge.

Figure 3:
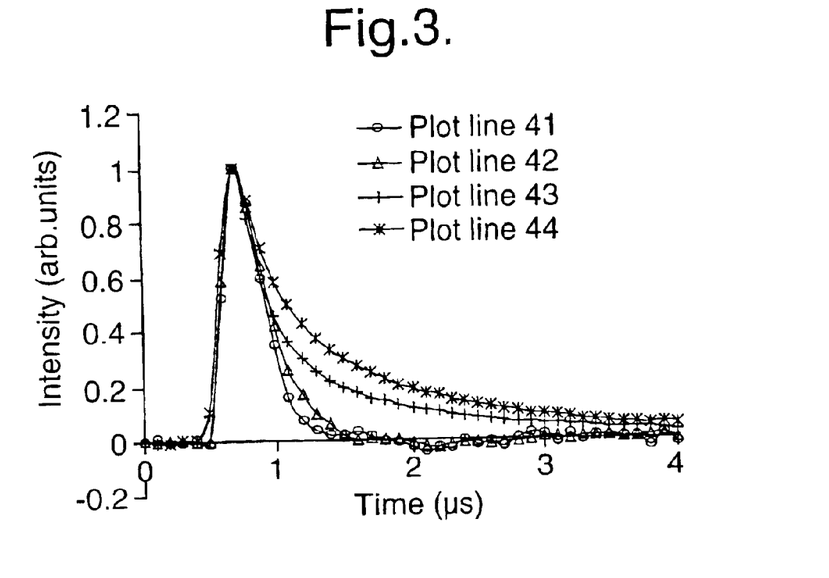
FIG. 3 shows a normalised optical emission intensity profile of the layout shown in FIG. 2 comparing the laser emission with the discharge emission with varying gases

The arrangement at FIG. 2 was connected to a laser head and the laser energy was measured. FIG. 3 shows the optical pulse shape for the discharge and laser emission for cases where the cover gas is either $Xe/SF_6$ or $Kr/SF_6$. The plots in FIG. 3 have been normalised to show the pulse length and shape. Plot lines 41 and 42 show the laser emission with $Kr/SF_6$ and $Xe/SF_6$ respectively. Plot lines 43 and 44 show the discharge emission from $Kr/SF_6$ and $Xe/SF_6$ respectively. FIG. 3 shows how laser emission responded to the optical excitation pulse and shows the laser pulse length was ~400 ns.

Figure 4:
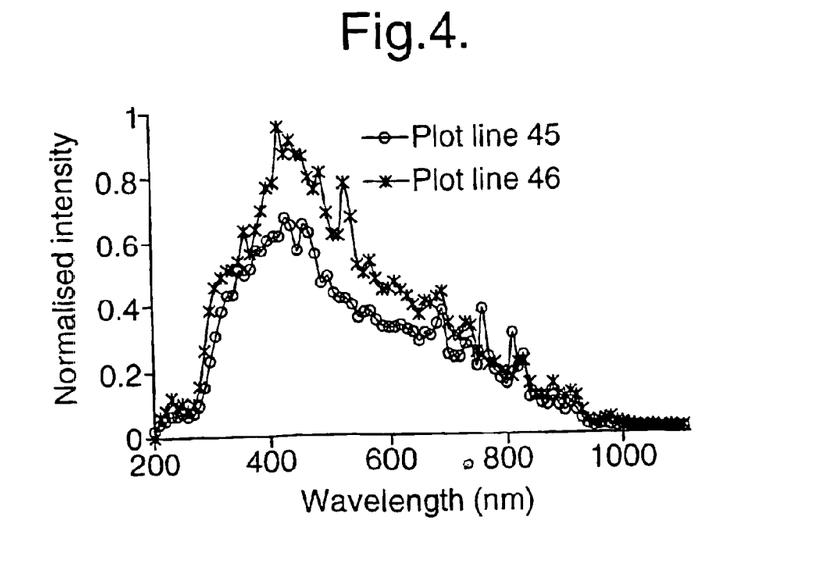
FIG. 4 shows the normalised emission spectrum for varying gas types in a device of the type shown in FIG. 2

FIG. 4 shows the spectral energy emission of the surface discharge over a PTFE substrate for the $Kr/SF_6$ (plot 45) and $Xe/SF_6$ (Plot 46). As can be seen there is considerable emission in the optical region of the spectrum thus making this surface discharge arrangement appropriate as a source for an optical dye laser.

Figure 5A:
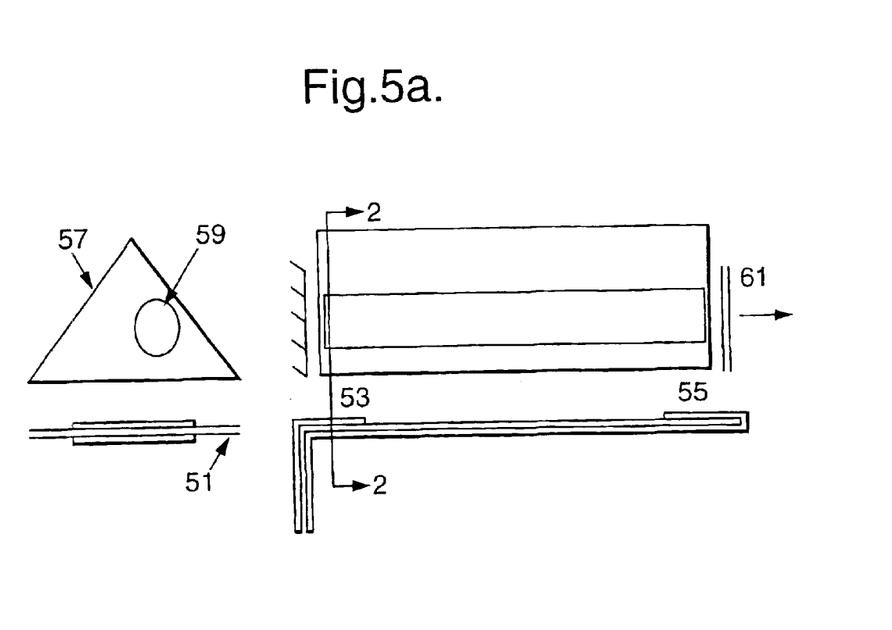
FIGS. 5a and 5b show schematics of different laser dye heads (The figures show two laser heads in cross section and longitudinal section—in each case the cross sectional view is along the line 2—2 indicated in the longitudinal view)
Figure 5B:
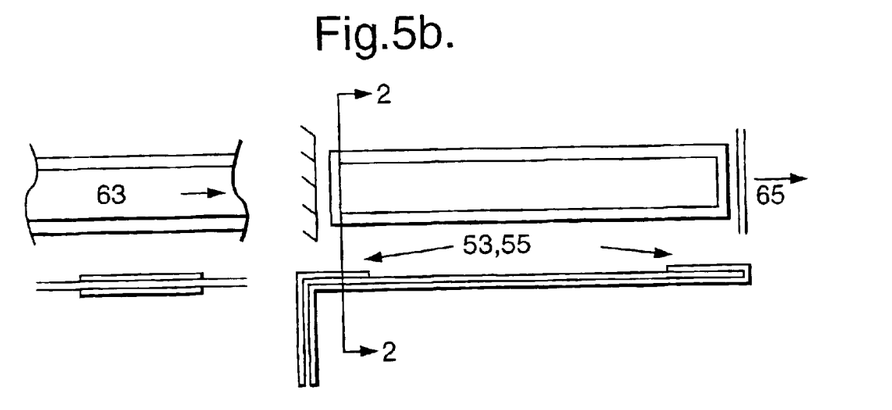

FIGS. 5a and 5b show two laser head arrangements suitable for use with a surface discharge pump source. FIG. 5a shows a Bethune cell arrangement. Here the pump source (substrate 51 and electrodes 53, 55) is located below one face of a triangular cross-sectioned Herasil® silica dye cell 57. Most of the light emitted by the surface discharge is reflected by the walls of the cell into a dye filled channel 59 in the silica. Laser output is shown by the arrow 61.

FIG. 5b shows an alternative laser head arrangement, the transverse flow dye laser. In this configuration the dye flows above the surface of the substrate (as indicated by arrow 63). Laser output is in a direction perpendicular to the dye flow, see arrow 65 (in the longitudinal view of FIG. 5b the dye will be flowing either into or out of the page). In FIG. 5b like numerals are used to identify identical elements of the device to those shown in FIG. 5a.

In both FIGS. 5a and 5b the dye solution consisted of 86 $\mu$M rhodamine 6 G in a methanol solvent. The Bethune cell was observed to operate at a higher level of efficiency than the transverse flow cell.

Figure 6:
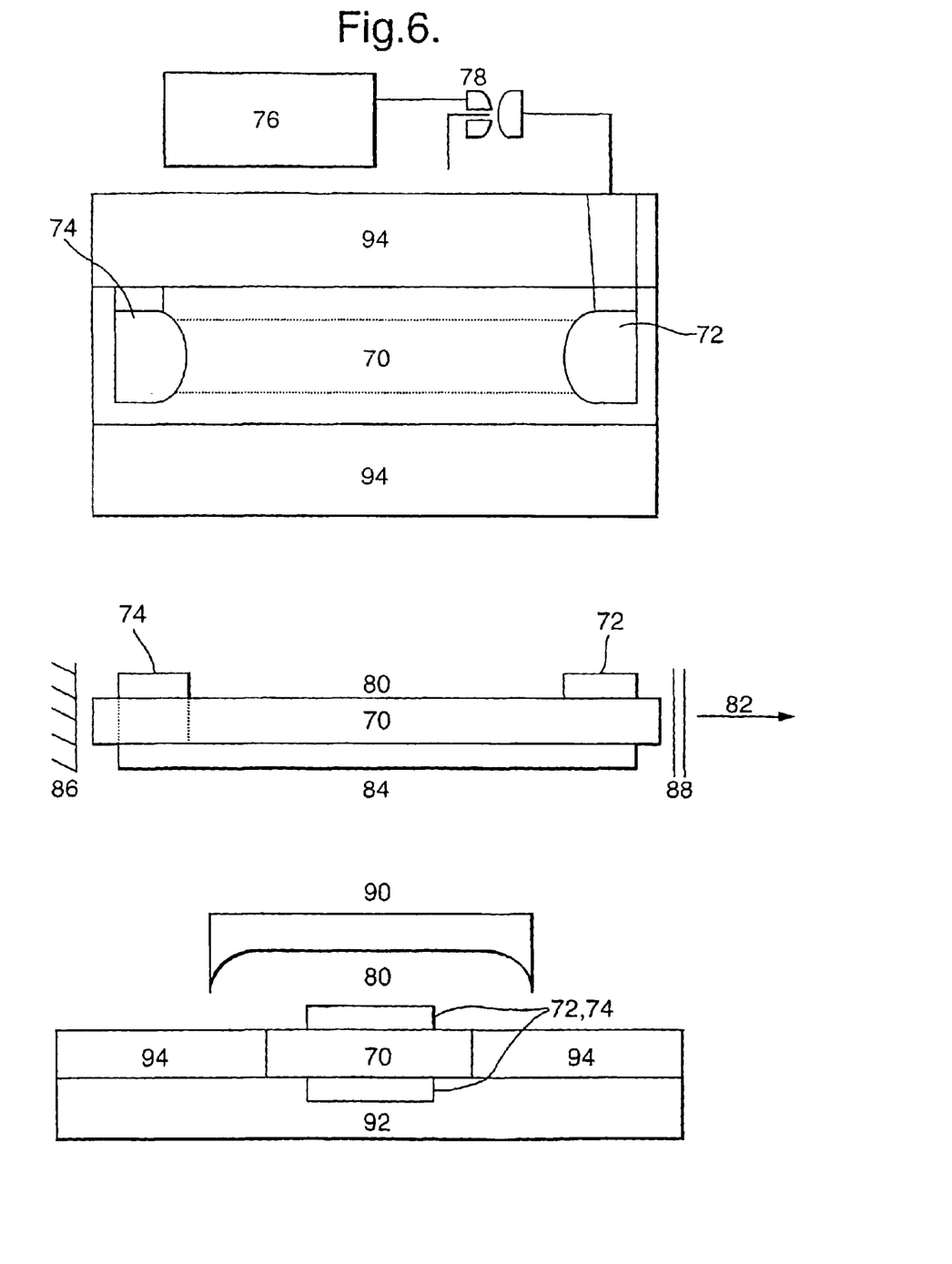
FIG. 6 shows various views of a surface discharge pumped dye laser head and discharge circuit according to the solid state dye laser pump source embodiment

FIG. 6 shows three views of a solid state dye laser head arrangement. A planar dielectric polymer slab 70 Pyr 597 doped (modified poly(methyl methacrylate) polymer—MPMMA) is connected via electrodes (72, 74) to a discharge circuit 76. The load is separated from the discharge circuit by a nitrogen filled Trigatron spark gap 78.

The substrate is covered by a gas 80 (Xenon at 0.5 bar). The stripline and electrodes have a low inductance arrangement, i.e. the return from the earth electrode 74 to the discharge circuit is on the underside of the substrate (earth return 84). At one end of the slab there is a 100% reflective mirror 86 and at the other end an output coupler 88. The distance between the 100% mirror and the output coupler is minimised by arranging the striplines so they lie at right angles to the surface discharge propagation and laser emission directions 82

A PTFE reflector 90 and PTFE sheet 92 are respectively placed above and below the substrate in order to maximise the coupling of the discharge light into the gain medium. Un-modified PMMA is used as an insulating sheet either side of the dye slab 94.

The substrate 70 depicted in the figure had a length of 14 cm, a width of 5 cm and a thickness of 4 mm. The laser dye pyrromethene 597 (Pyr 597) is incorporated into the substrate at a concentration of $10^{-4}$ M. (Note: To pump a laser dye effectively, the surface discharge should have intense emission in the laser dye absorption bands. Because the dye is doped into MPMMA which only transmits above ~290 nm, only the visible absorption band of Pyr 597 is pumped (470–554 nm).)

The electrodes are 11 cm apart and 2.5 cm wide with ~2 mm radiussed corners. The electrode separation limits the discharge length to 11 cm. The discharge circuit is designed to deliver 100 J of electrical energy to the surface discharge load in a ~80 MW pulse. A surface discharge with this energy loading, power loading and discharge length produces a discharge impedance of approximately 0.5 $\Omega$ and so the discharge circuit is designed as a matched 0.5 $\Omega$ lumped element pulse-forming network (pfn). The circuit consists of 5 parallel L-C elements with a total storage capacitance of 1.14 $\mu$F. When using a 0.5 $\Omega$ load the pulse length was designed to be 1.25 $\mu$s.

The circuit was charged to 13.3 kV corresponding to a capacitively storage energy of 100 J and hence a peak power of 80 MW for a 0.5 $\Omega$ load. In order to minimise the stray circuit inductance, which distorts the electrical pulse shape, the circuit components are connected using low inductance copper striplines 10 cm wide, 0.5 mm apart with a Mylar dielectric layer.

The earth stripline which is placed under the dye slab (84) provides the discharge with capacitive coupling via the substrate.

Figure 7:
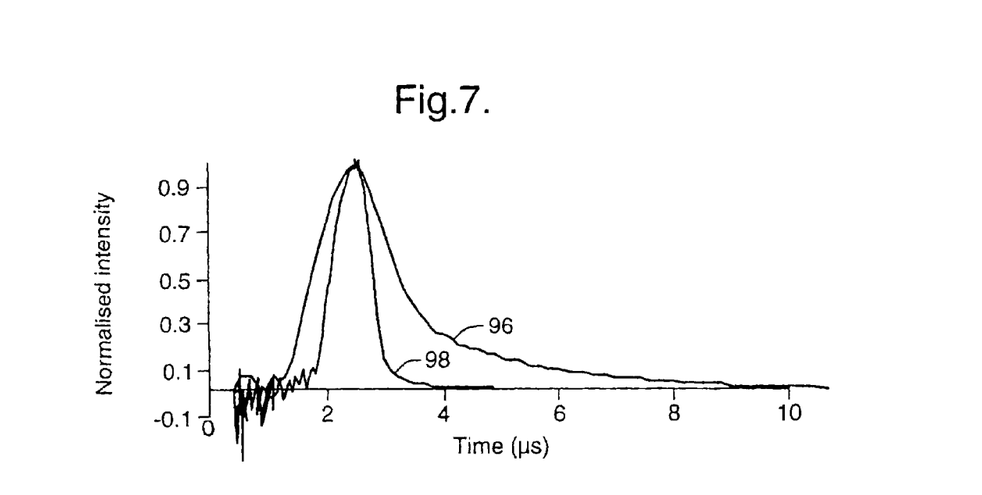
FIG. 7 shows the optical pulse shape of (96) the surface discharge optical emission and (98) the laser emission produced from the set-up in FIG. 6

FIG. 7 compares the optical pulse shape of the surface discharge 96 and the laser output 98. The optical pulse length was 1.9 $\mu$s with a 6.5 $\mu$s tail. The laser pulse was 950 ns long, shorter than the surface discharge emission pulse as expected.

Figure 8:
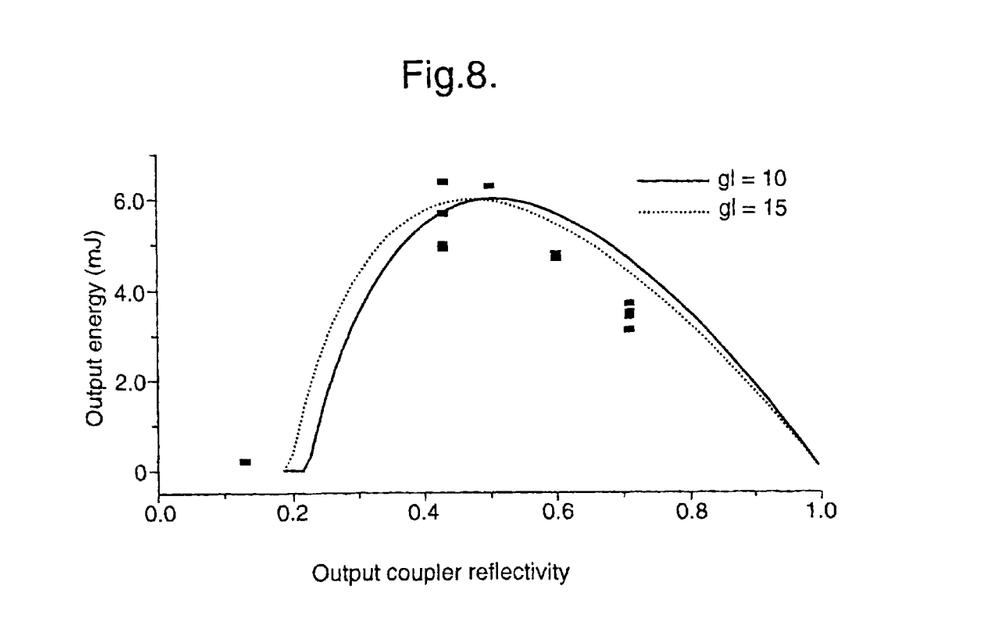
FIG. 8 shows the laser energy produced from the set-up in FIG. 6

The highest enrgy value for the laser was 69 mJ—see FIG. 8—which was obtained for an output coupler reflectivity of 50%. For the laser pulse shown in FIG. 4 this gave a power output of 73 kW.

The skilled person will readily appreciate that a range of other arrangements for the pump source are understood to be within the scope of this invention. For example, for the arrangement shown in FIG. 6 a dye doped polymer with lower absorption at the lasing wavelength could be used. Also, the surface discharge could be modified to ensure there is more emission in the visible absorption band of the laser dye.

What is claimed is:

1. A pump source for a laser comprising a slab of dielectric material wherein the slab of dielectric material is a polymer, ceramic or glass material said slab having at least part of its surface exposed, containment means for retaining a gas in contact with said exposed surface said containment means being capable of being charged with a suitable gas and an energy supply means arranged such that in operation of the source said supply means is capable of supplying energy across said exposed surface of the substrate thereby initiating a surface discharge wherein the impedance of the energy supply means is substantially matched to the impedance of the surface discharge and the energy supply means comprises stripline electrodes connected to the substrate such that, in use, they are substantially at right angles to the surface discharge propagation direction.

2. A pump source as claimed in claim 1 wherein the energy supply means comprises a self matched cable pulse generator.

3. A pump source as claimed in claim 1 wherein the energy supply means comprises a low inductance resonant discharge circuit.

4. A pump source as claimed in claim 3 wherein the discharge circuit is capable of discharging energy within a few hundred nanoseconds.

5. A pump source as claimed in claim 1 wherein the containment means is charged with a noble gas at a pressure of less than 1.5 bar.

6. A pump source as claimed in claim 5 wherein the gas additionally comprises a small percentage of $SF_6$.

7. A pump source as claimed in claim 1 wherein the cover gas comprises carbon dioxide.

8. A pump source as claimed in claim 1 wherein the energy supply means is operably connected to the dielectric material by means of profiled electrodes.

9. A pump source as claimed in claim 1 wherein the dielectric material is PTFE.

10. A pump source as claimed in claim 1 wherein the dielectric material thickness is in the range of 0.5–6 millimeters.

11. A pump source as claimed in claim 1 wherein the dielectric material is doped.

12. A pump source for a solid dye laser comprising a pump source according to claim 1 wherein the slab of dielectric material is capable of acting as a laser gain material.

13. A pump source as claimed in claim 12 wherein the dielectric substrate material is a sol-gel, ormosil polymer or polymer filled glass.

14. A pump source as claimed in claim 12 wherein the dielectric material is doped with a laser dye.

15. A pump source as claimed in claim 14 wherein the laser dye is a pyrromethene.

16. A pump source as claimed in claim 15 wherein the laser dye is Pyr 597.

17. A pump source as claimed in any one of claims 12 to 16 wherein the dielectric material thickness is in the range of 0.5–6 millimeters.

18. A dye laser comprising a pump source as claimed in any one of claims 1 to 8 and 9 to 11 and a laser head comprising a dye gain medium wherein the laser head has a Bethune cell configuration.

19. A dye laser comprising a pump source as claimed in any one of claims 1 to 8 and 9 to 11 and a laser head comprising a dye gain medium wherein the laser head has a transverse-flow configuration.

20. A dye laser comprising a pump source according to any one of claims 1 to 8 and 9 to 11 and a laser head comprising a PTFE reflector placed above the substrate and PTFE sheet beneath the substrate.

21. A method of pumping the gain medium of a laser comprising the steps of:
  i) retaining a gas in contact with an exposed surface of a slab of dielectric material;
  ii) discharging energy across the exposed surface of the dielectric material by means of an energy supply circuit in order to initiate a surface discharge; wherein
  iii) the impedances of the surfaces discharge and the energy supply circuit are arranged to be substantially matched; and wherein the slab of dielectric material is doped such that it is capable in use of acting as a laser gain material.

22. A pump source for a laser comprising a slab of dielectric material said slab having at least part of its surface exposed, containment means for retaining a gas in contact with said exposed surface said containment means being capable of being charged with a suitable gas and an energy supply means arranged such that in operation of the source said supply means is capable of supplying energy across said exposed surface of the substrate thereby initiating a surface discharge wherein the impedance of the energy supply means is substantially matched to the impedance of the surface discharge and the slab of dielectric material is doped such that it is capable in use of acting as a laser gain material.

23. A pump source according to claim 22 wherein the slab of dielectric material is doped with a laser dye.

24. A pump source as claimed in claim 23 wherein the energy supply means comprises a self matched cable pulse generator.

25. A pump source as claimed in claim 23 wherein the energy supply means comprises a low inductance resonant discharge circuit.

26. A pump source as claimed in claim 25 wherein the discharge circuit is capable of discharging energy within a few hundred nanoseconds.

27. A pump source as claimed in claim 23 wherein the containment means is charged with a noble gas at a pressure of less than 1.5 bar.

28. A pump source as claimed in claim 27 wherein the gas additionally comprises a small percentage of $SF_6$.

29. A pump source as claimed in claim 23 wherein the cover gas comprises carbon dioxide.

30. A pump source as claimed in claim 23 wherein the energy supply means is operably connected to the dielectric material by means of profiled electrodes.

31. A pump source as claimed in claim 23 wherein the energy supply means comprise stripline electrodes connected to the substrate such that, in use, they are substantially at right angles to the surface discharge propagation direction.

32. A pump source as claimed in claim 23 wherein the dielectric material thickness is in the range of 0.5–6millimeters.

33. A pump source as claimed in claim 23 wherein the dielectric substrate material is a sol-gel, ormosil polymer or polymer filled glass.

34. A pump source as claimed in claim 23 wherein the laser dye is a pyrromethene.

35. A pump source as claimed in claim 34 wherein the laser dye is Pyr 597.

36. A dye laser comprising a pump source as claimed in any one of claims 24 to 35 or 23 and a laser head comprising a dye gain medium wherein the laser head has a Bethune cell configuration.

37. A dye laser comprising a pump source according to any one of claims 24 to 35 or 23 and a laser head comprising a PTFE reflector placed above a substrate and a PTFE sheet beneath the substrate.

* * * * *